US006639743B2

United States Patent
Watanabe

(10) Patent No.: US 6,639,743 B2
(45) Date of Patent: Oct. 28, 2003

(54) COOLING MECHANISM OF OPTICAL MODULATOR, OPTICAL MODULATOR ATTACHMENT UNIT AND PROJECTOR

(75) Inventor: Nobuo Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/963,456

(22) Filed: Sep. 27, 2001

(65) Prior Publication Data

US 2002/0036819 A1 Mar. 28, 2002

(30) Foreign Application Priority Data

Sep. 28, 2000 (JP) .......................................... 2000-296399
Sep. 26, 2001 (JP) .......................................... 2001-294879

(51) Int. Cl.⁷ ................................................. G02B 7/02
(52) U.S. Cl. ..................... 359/820; 359/512; 359/636
(58) Field of Search ............................... 359/638, 820, 359/827, 618, 252, 630, 512; 353/119, 81; 349/10, 58

(56) References Cited

U.S. PATENT DOCUMENTS

| 5,868,485 A | * | 2/1999 | Fujimori et al. ............. 353/119 |
| 5,978,054 A | | 11/1999 | Fujimori ....................... 349/60 |
| 6,056,407 A | | 5/2000 | Iinuma et al. ................ 353/119 |
| 6,135,600 A | | 10/2000 | Fujimori ....................... 353/119 |
| 6,375,328 B2 | * | 4/2002 | Hashizume et al. ........... 353/30 |
| 6,377,318 B1 | * | 4/2002 | Menard ....................... 348/745 |
| 2002/0015138 A1 | * | 2/2002 | Ito et al. ...................... 353/57 |

FOREIGN PATENT DOCUMENTS

| EP | 1 041 828 A2 | 10/2000 |
| JP | 8-304739 A | 11/1996 |
| JP | 10010994 A | 1/1998 |
| JP | 11160788 A | 6/1999 |
| JP | 2000010186 A | 1/2000 |
| JP | 2000221587 A | 8/2000 |
| JP | 2000221588 A | 8/2000 |
| JP | 3120685 B2 | 10/2000 |
| WO | WO 95/12142 A1 | 5/1995 |
| WO | WO 98/27453 A1 | 6/1998 |

* cited by examiner

Primary Examiner—Ricky Mack
Assistant Examiner—Brandi N Thomas
(74) Attorney, Agent, or Firm—Oliff & Berridge, PLC

(57) ABSTRACT

A support member (311) for supporting liquid crystal panels (441R, 441G, 441B) is disposed parallel to a cooling air flow channel formed between a light-incident end of a cross dichroic prism (45) and the respective liquid crystal panels and is constructed by a pair of components for supporting a neighborhood of the ends of the respective liquid crystal panels, so that the gap between the light-incident end of the cross dichroic prism and the respective liquid crystal panels facing the cooling air flow channel can be enlarged, thereby flowing cooling air sufficient for cooling a polarizer (446) and the respective liquid crystal panels in a direction of the cooling air flow channel for efficiently cooling them.

24 Claims, 12 Drawing Sheets

COOLING MECHANISM OF OPTICAL MODULATOR, OPTICAL MODULATOR ATTACHMENT UNIT AND PROJECTOR

BACKGROUND OF THE INVENTION

1. Field of the Invention

The present invention relates to a cooling mechanism of an optical modulator attached to a light-incident end of a prism, an optical modulator attachment unit for attaching the optical modulator on a light-incident end of the prism and a projector having the same.

2. Description of Related Art

Conventionally, a projector including three optical modulators for modulating a plurality of colors of light in accordance with image information, a cross dichroic prism for combining the color light modulated by the three optical modulator, and a projection lens for enlarging and projecting the light combined by the prism has been used.

Such projectors have been widely used for multimedia presentation in a meeting, scientific society, exhibition etc., and size reduction thereof has been strongly desired since such projectors are brought to other locations as necessary and is brought to other places for storing.

In recent years, in order to reduce size and simplify structure thereof, an arrangement for attaching the optical modulator to a light-incident end of the prism has come to be used. For instance, according to an arrangement shown in Japanese Patent Laid-Open Publication No. Hei 2000-221588, three optical modulators are respectively held by a holding frame and a stick member is inserted to four corners of the holding frame with a distal end thereof being fixed to the light-incident end of the cross dichroic prism by an adhesive, thereby attaching the optical modulator to the cross dichroic prism.

According to another arrangement shown in International Publication No. WO98/27453, an optical modulator held by a holding frame is attached to a light-incident end of the prism through a frame body and a wedge-shaped spacer. A guide for guiding the wedge-shaped spacer is formed on the holding frame.

A polarizer for polarizing the light modulated by the optical modulator is provided between the optical modulator and the light-incident end of the prism. The polarizer is directly adhered to the light-incident end of the prism by an adhesive etc.

The polarizer is formed by attaching a polarizing film to a glass substrate. The polarizing film can be deteriorated on account of heat generated by the light passing the prism and the optical modulator after long use and projected image quality can be deteriorated in accordance therewith. On the other hand, since the optical modulator is also weak in heat, the optical modulator has to be cooled by cooling air. Accordingly, in order to efficiently cool the polarizer and the optical modulator, there is an idea for feeding the cooling air between the light-incident end of the prism and the optical modulator.

However, only a narrow gap is formed between the prism and the optical modulator in accordance with size reduction, even when cooling air is sent from lower side of the prism by, for instance, a suction fan etc., only a little air enters between the prism and the optical modulator, so that efficient cooling of the polarizer and the optical modulator is difficult.

Further, an axial fan is used as a suction fan disposed on the lower side of the prism. Since the cooling air exhausted from the axial fan flows in spiral, the cooling air is blown to the surface of the optical modulator obliquely upward, so that it is difficult to uniformly cool the surface of the optical modulator.

SUMMARY OF THE INVENTION

An object of the present invention is to provide a cooling mechanism of an optical modulator capable of efficiently cooling a polarizer, an optical modulator etc., an optical modulator attachment unit and a projector having the cooling mechanism.

A cooling mechanism of optical modulator according to the present invention is for an optical modulator plurally attached to a light-incident end of a prism for modulating a plurality of color lights in accordance with image information and for emitting the modulated light to the light-incident end of the prism, the cooling mechanism including: a base member attached to the light-incident end of the prism; and a support member attached to the base member for supporting the optical modulator, the support member including a pair of components disposed parallel to a cooling air flow channel formed between the light-incident end of the prism and the optical modulator and for supporting a neighborhood of an end of the optical modulator.

The plurality of optical modulators may be, for instance, three optical modulators for modulating red, green and blue light beams, which may be attached to the light-incident end of the prism by, for instance, an arrangement where the gap between the light-incident end of the prism and the optical modulator is likely to become small such as attaching the optical modulator to the light-incident end of the prism by a screw or a spacer.

According to the present invention, since the support member for supporting the optical modulator is formed by a pair of components disposed parallel to the cooling air flow channel formed between the light-incident end of the prism and the optical modulator for supporting the neighborhood of the end of the optical modulator, the gap between the light-incident end of the prism and the optical modulator facing the cooling air flow channel can be enlarged, so that cooling air sufficient for cooling the polarizer and the optical modulator can be flowed in the direction of the cooling air flow channel. Accordingly, the polarizer and the optical modulator can be efficiently cooled.

In the cooling mechanism according to the present invention, a polarizer may preferably be provided on a light-emitting side of the optical modulator, a polarizer fixing plate for holding and fixing the polarizer may preferably interposed between the base member and the fixing plate; and the polarizer fixing plate may preferably hold and fix the polarizer being spaced apart from the light-incident end of the prism with a predetermined gap therebetween.

Accordingly, sufficient cooling air can be flowed not only between the polarizer and the optical modulator but also between the polarizer and the light-incident end of the prism, so that both sides of the polarizer can be efficiently cooled.

In the cooling mechanism according to the present invention, the support member may preferably include a fixing plate attached to the base member, an optical modulator fixing plate attached to the optical modulator and a spacer interposed between the fixing plate and the optical modulator fixing plate, the fixing plate, the optical modulator fixing plate and the spacer being disposed around the end of the optical modulator approximately in parallel.

Accordingly, since the gap between the light-incident end of the prism and the optical modulator facing the cooling air flow channel can be enlarged as mentioned above, the cooling efficiency can be enhanced, and the focus and alignment of the optical modulator can be adjusted only by changing the insertion amount of the pair of spacers inserted to the end.

In the cooling mechanism according to the present invention, a slanted surface for guiding the spacer may preferably be formed on the optical modulator fixing plate.

Accordingly, since the insertion amount of the spacer can be adjusted along the slanted surface, the focus and alignment adjustment of the optical modulator can be facilitated.

In the cooling mechanism according to the present invention, a cooling fan for cooling the optical modulator and a wind guide provided between the cooling fan and the optical modulator for introducing the cooling air from the cooling fan in a predetermined direction may preferably be provided, the wind guide including a first guide plate for directing the cooling air toward between the light-incident end of the prism and the optical modulator.

By introducing the cooling air from the cooling fan toward between the light-incident end of the prism and the optical modulator by the first guide plate, the cooling air from the cooling fan can be securely guided to the gap between the light-incident end of the prism and the optical modulator, so that the polarizer and the optical modulator can be further efficiently cooled.

In the cooling mechanism according to the present invention, the wind guide may preferably include a second guide plate extending in a direction orthogonal with an image formation area of the optical modulator.

The cooling fan disposed below the prism is ordinarily an axial flow fan. Since the air discharged from the axial flow fan flows in spiral, the cooling air blows the surface of the optical modulator obliquely upward, so that it is difficult to send the cooling air toward, for instance, corners of the optical modulator.

However, when the second guide plate is provided, turbulence can be generated to the air from the cooling fan by the second guide plate, so that the entire image formation area of the optical modulator can be uniformly cooled. Further, by disposing the second guide plate on an upstream side of the spiral air discharged from the cooling fan relative to the horizontal center of the image formation area, the entire image formation area of the optical modulator can be more uniformly and efficiently cooled.

In the cooling mechanism according to the present invention, the wind guide may preferably be provided in accordance with the number of the optical modulator, and the plurality of wind guides may preferably be integrally formed.

Accordingly, the wind guide can be more easily formed as compared to an arrangement where the wind guide is independently provided for each optical modulator, so that the wind guide can be easily assembled to the optical modulator.

The present invention not only can be applied to the cooling mechanism of the optical modulator, but also can be applied as a projector having the cooling mechanism of the optical modulator where the same functions and effects can be obtained.

An optical modulator attachment unit according to the present invention is for attaching an optical modulator to a light-incident end of a prism, the attachment unit including: a holding frame for holding the optical modulator; a base member attached to the light-incident end of the prism; and a pair of support members attached between the base member and the holding frame, the support member including a pair of components for supporting a neighborhood of an end of the optical modulator.

The plurality of optical modulators may be, for instance, three optical modulators for modulating red, green and blue light beams.

According to the present invention, since the support member is provided between the base member for supporting the optical modulator and the holding frame, the gap between the light-incident end of the prism and the optical modulator can be enlarged, so that cooling air sufficient for cooling the polarizer, the optical modulator etc. can be flowed. Accordingly, the polarizer and the optical modulator can be efficiently cooled.

In the optical modulator attachment unit according to the present invention, a polarizer may preferably be provided on the light-emitting side of the optical modulator, a polarizer fixing plate for holding and fixing the polarizer on the light-emitting side may preferably interposed between the base member and the optical modulator; and the polarizer fixing plate may preferably hold and fix the polarizer being spaced apart from the light-incident end of the prism with a predetermined gap therebetween.

Accordingly, sufficient cooling air can be flowed not only between the polarizer and the optical modulator but also between the polarizer and the light-incident end of the prism, so that both sides of the polarizer can be efficiently cooled.

In the optical modulator attachment unit according to the present invention, the support member may preferably include a fixing plate attached to the base member, an optical modulator fixing plate attached to the optical modulator and a spacer interposed between the fixing plate and the optical modulator fixing plate.

Accordingly, since the gap between the light-incident end of the prism and the optical modulator can be enlarged, the cooling efficiency can be enhanced, and the focus and alignment of the optical modulator can be adjusted only by changing the insertion amount of the pair of spacers.

In the optical modulator attachment unit according to the present invention, a slanted surface for guiding the spacer may preferably be formed on the optical modulator fixing plate.

Accordingly, since the insertion amount of the spacer can be adjusted along the slanted surface, the focus and alignment adjustment of the optical modulator can be facilitated. Further, though the structure of the holding frame can be complicated for forming a guide on the holding frame for guiding the wedge-shaped spacer in the arrangement disclosed in the International Publication No. WO98/27453, since the guide for guiding the spacer is not necessarily formed on the holding frame in the above arrangement, the production cost can be reduced.

The present invention not only can be applied to the optical modulator attachment unit, but also can be applied as a projector having the optical modulator attachment unit for obtaining the same functions and effects.

In the optical modulator attachment unit according to the present invention, a cooling fan for cooling the optical modulator and a wind guide provided between the cooling fan and the optical modulator for introducing the cooling air from the cooling fan in a predetermined direction may preferably be provided, the wind guide including a first guide plate for directing the cooling air toward between the light-incident end of the prism and the optical modulator.

By introducing the cooling air from the cooling fan toward between the light-incident end of the prism and the optical modulator by the first guide plate, the cooling air from the cooling fan can be securely guided to the gap between the light-incident end of the prism and the optical modulator, so that the polarizer and the optical modulator can be further efficiently cooled.

In the optical modulator attachment unit according to the present invention, the wind guide may preferably include a second guide plate extending in a direction orthogonal with an image formation area of the optical modulator.

The cooling fan disposed below the prism is ordinarily an axial flow fan. Since the air discharged from the axial flow fan flows in spiral, the cooling air blows the surface of the optical modulator obliquely upward, so that it is difficult to send the cooling air toward, for instance, corners of the optical modulator.

However, when the second guide plate is provided, turbulence can be generated to the air from the cooling fan by the second guide plate, the entire image formation area of the optical modulator can be uniformly cooled. Further, by disposing the second guide plate on an upstream side of the spiral air discharged from the cooling fan relative to the horizontal center of the image formation area, the entire image formation area of the optical modulator can be more uniformly and efficiently cooled.

In the optical modulator attachment unit according to the present invention, the wind guide may preferably be provided in accordance with the number of the optical modulator, and the plurality of wind guides may preferably be integrally formed.

Accordingly, the wind guide can be more easily formed as compared to an arrangement where the wind guide is independently provided in accordance with respective optical modulator, so that the wind guide can be easily assembled to the optical modulator.

DETAILED DESCRIPTION OF PREFERRED EMBODIMENT(S)

An embodiment of the present invention will be described below with reference to attached drawings.

[1. Primary Arrangement of Projector]

Figure 1:
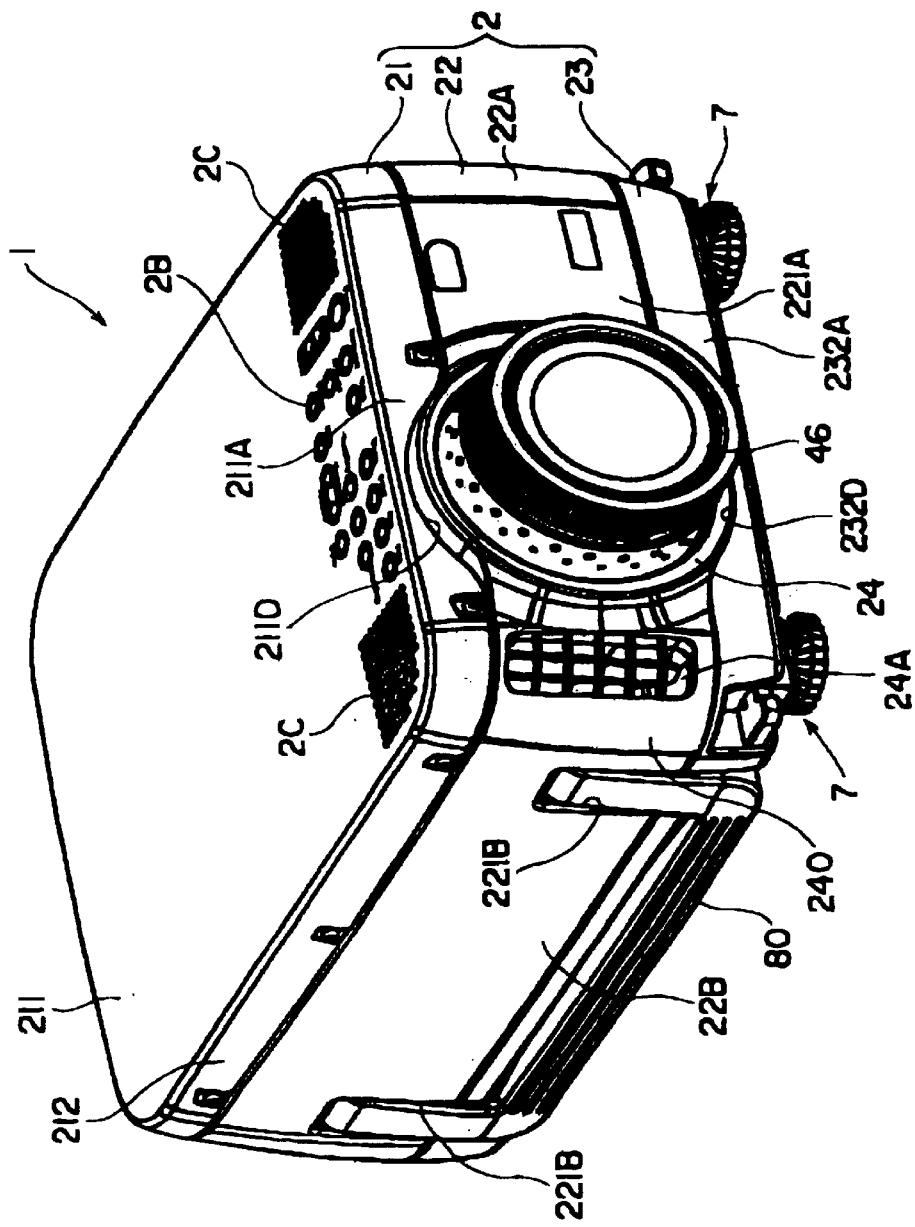
FIG. 1 is an entire perspective seen from above showing a projector according to an embodiment of the present invention.
Figure 2:
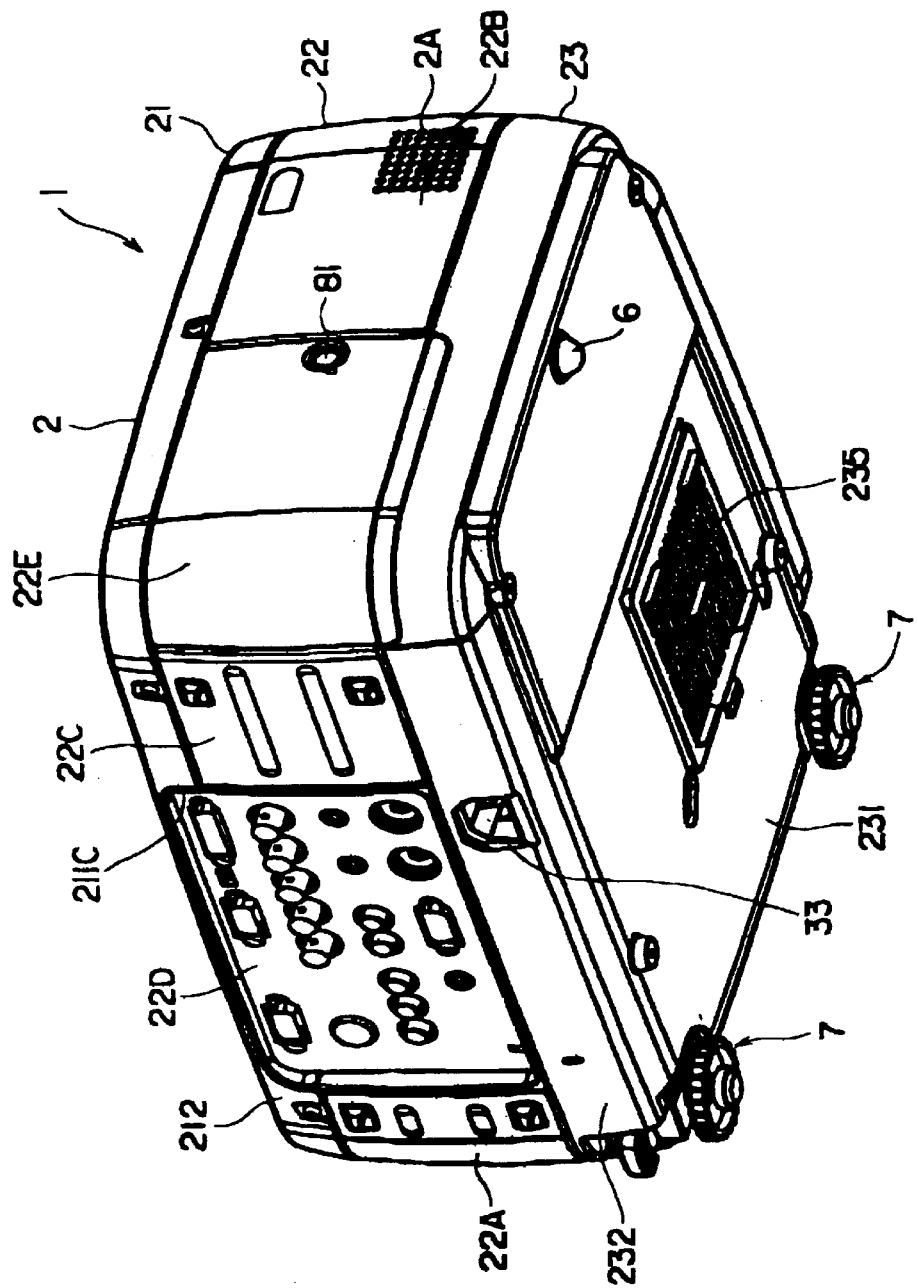
FIG. 2 is an entire perspective showing the projector according to the aforesaid embodiment seen from below.
Figure 3:
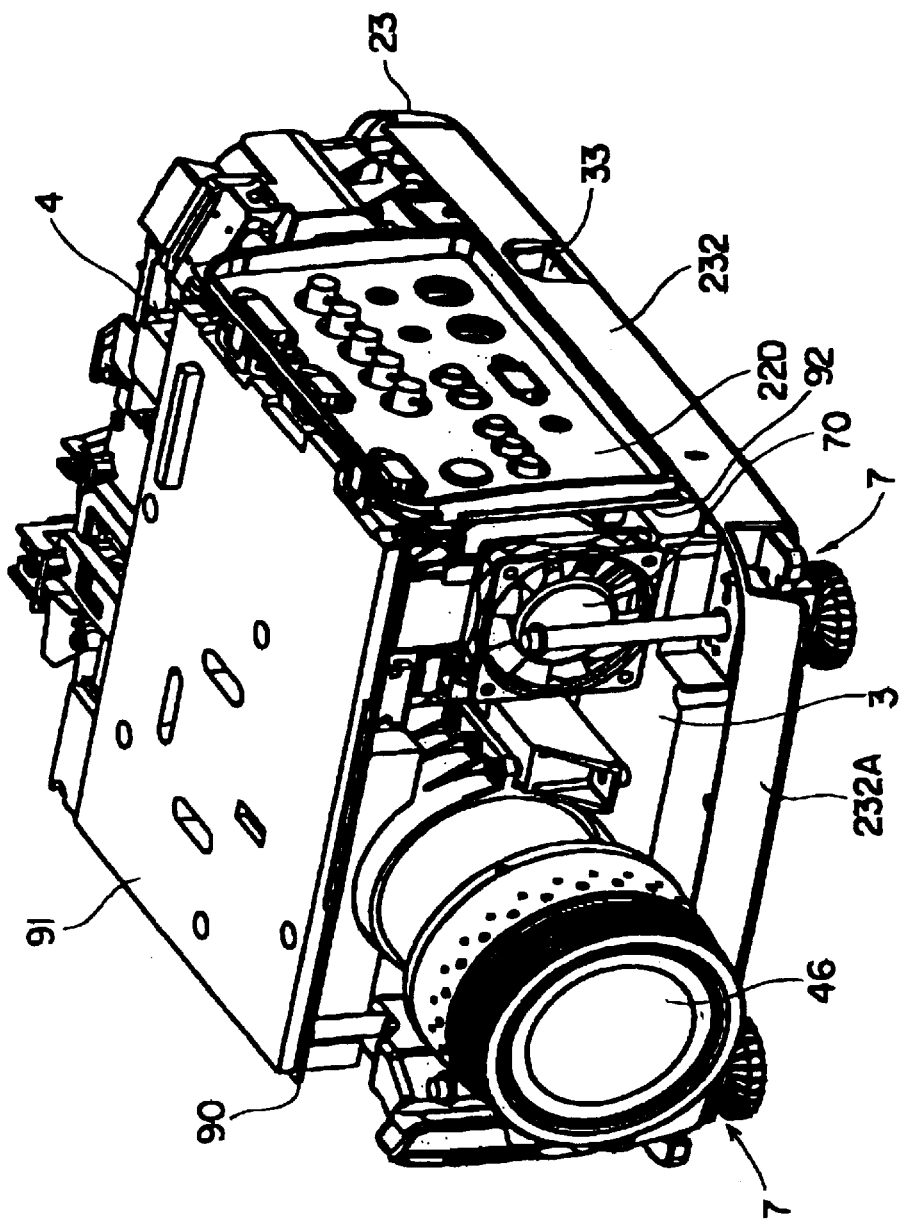
FIG. 3 is an entire perspective view showing an inside of the projector of the aforesaid embodiment.

FIG. 1 is an entire perspective view seen from above showing a projector 1 according to the present embodiment, FIG. 2 is another entire perspective view seen from below showing the projector 1 and FIG. 3 is a perspective view showing interior arrangement of the projector 1.

The projector 1 separates a light beam irradiated from a light source into three primary colors of red (R), green (G) and blue (B), modulates the light beams of respective colors in accordance with image information through the liquid crystal panel as an optical modulator constituting an electric optical device and combines the modulated light beams of respective colors by a cross dichroic prism to enlarge and display the beam on a projecting surface through a projection lens 46. Though respective components are accommodated in an exterior case 2, the projection lens 46 is protrudable and retractable from the exterior case 2 by a zoom mechanism thereof as necessary.

In FIGS. 1 to 3, the projector 1 has the exterior case 2 as a casing, a power supply unit 3 accommodated in the exterior case 2, and an optical unit 4 of planarly L-shape disposed in the exterior case 2, the entirety of the projector 1 being approximate rectangular solid.

The exterior case 2 includes a sheet-metal upper case 21 covering upper side of the device, a lower case 23 made of die casting such as magnesium constituting the bottom of the device, and a middle case 22 made of aluminum or bent steel plate disposed between the upper case 21 and the lower case 23 to cover the sides of the device. The cases 21, 22 and 23 are mutually fixed by a screw.

The upper case 21 is formed of an upper portion 211 and a side portion 212 disposed around the upper portion 211, which is, for instance, shaped by a press using a die. A circular hole 211D corresponding to a lens attachment frame 24 for attaching the projection lens 46 is provided to a front portion 211A side of the side portion 212, the neighborhood of the circular hole 211D being curved inwardly by drawing. A notch 211C (see FIG. 2) is formed on a side orthogonal with the front portion 211A of the side portion 212.

A manipulation switch 2B for adjusting image quality of the projector 1 is provided to the projection lens 46 side of the upper portion 211 of the upper case 21. A number of holes 2C for speaker are provided on both sides of the manipulation switch 2B.

The middle case 22 is, as described above, formed by bending aluminum plates etc., which includes a first case member 22A and a second case member 22B disposed on both sides of the projection lens 46, and a third case member at the back of the first case member 22A. An interface exposed member 22D exposing various connectors for the interface provided on an interface substrate 92 disposed inside the middle case 22 is disposed and connected between the first case member 22A and the third case member 22C and an openable and closable lamp cover 22E is provided between the second case member 22B and the third case member 22C.

The respective case members 22A, 22B and 22C have a configuration capable of being combined with the upper case 21 and the lower case 23 by bending the aluminum plates having a predetermined configuration blanked by a press or a machining center.

An opening (not shown) corresponding to the lens attachment frame 24 is formed between a front 221A formed on a front side of the first case member 22A and the second case member 22B. Another opening (not shown) is formed on the front 221A side of the second case member 22B, which opposes an exhaust hole 24A formed on the lens attachment frame 24.

The lens attachment frame 24 is attached to the middle case 22 to form the middle case 22. Incidentally, a cover 240 made of, for instance, plastic, is attached around the exhaust hole 24A.

Handle openings 221B extending from the lower case 23 toward the upper case 21 by a predetermined distance spaced apart with each other are provided to the second case member 22B. A handle 80 used in carrying the projector 1 is attached to the openings 221B.

As shown in FIG. 2, the lamp cover 22E has a knob 81 such as a screw on the second case member 22B side and is engaged to the peripheral end of the third case member 22C. The knob 81 is screwed to a nut (not shown) formed on the second case member 22B through an E ring. When the knob 81 is rotated to release screwing with the nut, the knob 81 projects to the outside from the lamp cover 22E by the amount being screwed. When the knob 81 is held to slide the lamp cover 22E along the side of the projector 1, the lamp cover 22E can be detached. Incidentally, since the knob 81 is supported by the E ring, the knob 81 is not detached from the lamp cover 22E even after releasing screwing with the nut.

As mentioned above, the lower case 23 is a die-casting of magnesium etc., where an approximately rectangular bottom portion 231 and a side portion 232 around the bottom portion are integrally formed. A reinforcing rib etc. is formed at a predetermined location inside the lower case 23, thereby securing strength of the entire lower case 23.

A height position adjuster 7 for adjusting inclination of the entire projector 1 to adjust position of the projected image is provided on both corners of front side of the bottom portion 231 of the lower case 23. On the other hand, a resin-made foot member 6 (FIG. 2) is fitted to the rear center of the bottom portion 231. Incidentally, the height position adjuster 7 advances and retracts in protruding direction by rotating the dial portion or manipulating lever thereof, the advancement and retraction being adjusted to change height and inclination of the displayed screen.

A fan cover 235 is attached to the bottom portion 231 of the lower case 23. A circular hole 232D corresponding to the lens attachment frame 24 is provided to a front portion 232A of the lower case 23.

An intake hole 2A for introducing cooling air to the inside, an exhaust hole 24A for exhausting the air after cooling, the manipulation switch 2B, the multiple holes 2C corresponding to positions of the speaker and the handle opening 221B are provided to the exterior case 2. Incidentally, the cooling air is introduced to the inside from the handle opening 221B.

Figure 5:
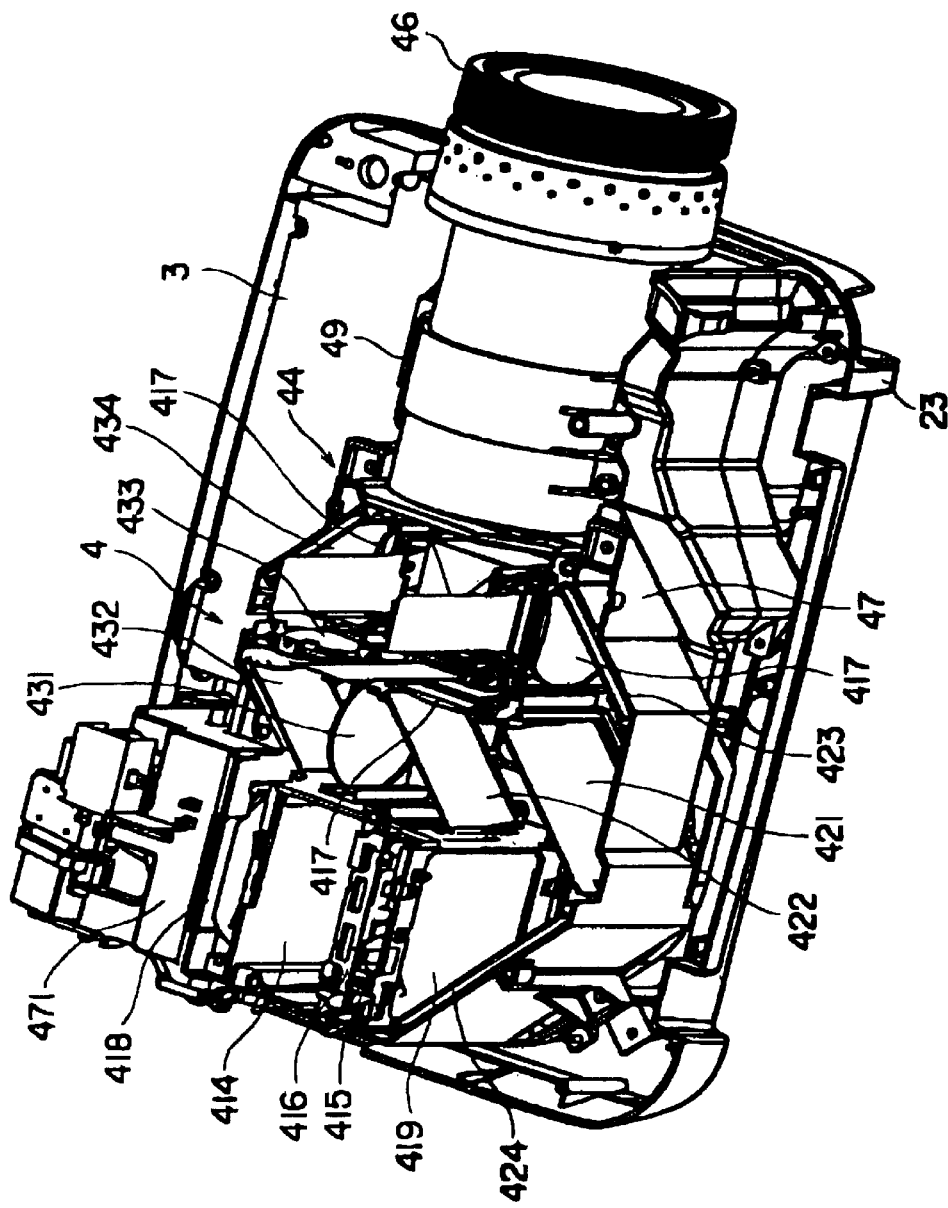
FIG. 5 is a perspective view showing components of the projector of the aforesaid embodiment.

As shown in FIGS. 3 and 5, the power unit 3 is composed of a main power supply (not shown) disposed on the bottom side in the exterior case 2 and a ballast disposed at the back of the main power supply. The main power supply supplies the electric power supplied through the power cable to the ballast and a driver board (not shown), which includes an inlet connector 33 for the power cable to be plugged (FIG. 3), an aluminum frame (not shown) surrounding the main power supply and a power circuit.

The ballast mainly supplies the electric power to a light source lamp 411 (FIG. 4) as a light source of the optical unit 4, which includes a lamp driving circuit as a light source driving circuit (not shown). An axial intake fan 70 as a cooling fan for introducing the air into the inside of the projector 1 is provided to the front side of the lamp driving circuit.

Figure 4:
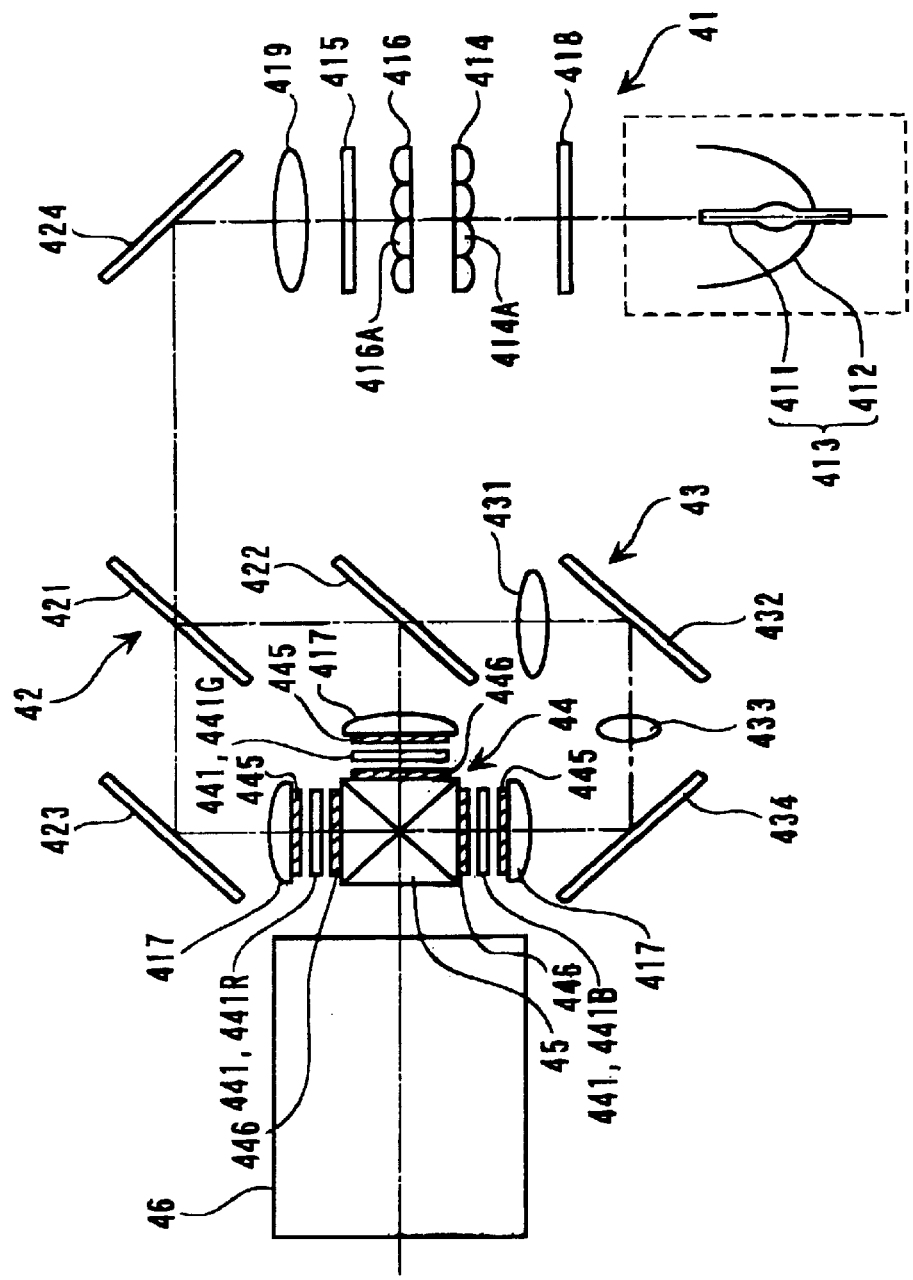
FIG. 4 is a plan view schematically showing respective optical systems of projector of the aforesaid embodiments.

As shown in FIG. 4, the optical unit optically processes the light beam irradiated from the light source lamp 411 to form an optical image corresponding to the image information, which includes an illuminating optical integrator system 41, a color separating optical system 42, a relay optical system 43, an electric optical device 44, a cross dichroic prism 45 as a color combining optical system and a projection lens 46 as a projection optical system.

[2. Detailed Arrangement of Optical System]

In FIG. 4, the illuminating optical integrator system 41 is an optical system for substantially uniformly illuminating the image formation areas of the three liquid crystal panels 441 (respectively represented as liquid crystal panels 441R, 441G and 441B for each color light of red, green and blue), which includes a light source 413, a UV filter 418, a first lens array 414 as a beam splitter, a second lens array 416, a polarization converter 415, a superimposing lens 419 and a reflection mirror 424.

The light source 413 constituting the illuminating optical integrator system 41 has the light source lamp 411 as a radial light source for emitting radial light beam and a reflector 412 for reflecting the radial light emitted from the light source lamp 411. A halogen lamp, a metal halide lamp, or a high-pressure mercury lamp is often used as the light source lamp 411. A parabolic mirror is used as the reflector 412, however, an ellipsoidal mirror and a parallelizing lens (concave lens) may be used.

The first lens array 414 has a matrix arrangement of lenses 414A having substantially rectangular profile viewed from optical axis direction. The respective lenses 414A split the beam emitted from the light source lamp 411 to pass the UV filter 418 into a plurality of partial light beams. The profile of the respective lenses 414A is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 416 has approximately the same arrangement as the first lens array 414, where the lenses 416A are disposed in matrix. The second lens array 416 as well as the superimposing lens 419 focuses the image from the respective lenses 414A of the first lens array 414 onto the liquid crystal panel 441.

The polarization converter 415 is disposed between the second lens array 416 and the superimposing lens 419 for converting the light from the second lens array 416 to a single polarized light in order to enhance light utilization efficiency in the electric optical device 44.

Specifically, the respective partial light converted into single polarized light by the polarization converter 415 is substantially superposed on the liquid crystal panels 441R, 441G and 441B of the electric optical device 44 by the superimposing lens 419. Since a liquid crystal panel 441 for modulating polarized light can use only single polarized light, without using the polarization converter 415, approximately half of the light from the light source lamp 411 cannot be used.

Accordingly, by using the polarization converter 415, all of the light emitted from the light source lamp 411 is converted into single polarized light to enhance light utilization efficiency in the electric optical device 44. Incidentally, such polarization converter 415 is disclosed in, for instance, Japanese Patent Laid-Open publication No. Hei 8-304739.

The color separating optical system 42 has two dichroic mirrors 421 and 422 and a reflection mirror 423, where the mirrors 421 and 422 separates the plurality of partial light beam irradiated from the illuminating optical integrator system 41 into three color lights of red, green and blue.

The relay optical system 43 includes an incident-side lens 431, a relay lens 433 and a reflection mirrors 432 and 434, which introduces blue light of the color lights separated by the color separating optical system 42 into the liquid crystal panel 441B.

At this time, the blue light component and the green light component of the light beam irradiated from the illuminating optical integrator system 41 are reflected by the dichroic mirror 421 of the color separating optical system 42 and the red light component transmits through the dichroic mirror 421. The red light transmitted through the dichroic mirror 421 is reflected by the reflection mirror 423, which reaches to the liquid crystal panel 441R for red-color through a field lens 417. The field lens 417 converts the respective partial light beam emitted from the second lens array 416 into a light beam parallel to central axis (main beam). The field lenses 417 provided in front of the other liquid crystal panels 441G and 441B function in the same manner.

In the blue light and the green light reflected by the dichroic mirror 421, the green light is reflected by the dichroic mirror 422 to reach the liquid crystal panel 441G for green color through the field lens 417. On the other hand, the blue color transmits through the dichroic mirror 422 to pass the relay optical system 43 and reach the liquid crystal panel 441B for blue color through the field lens 417. Incidentally, the relay optical system 43 is used for the blue color in order to prevent decrease in utilization efficiency of light on account of light diffusion caused by longer length of the optical path of the blue light than the length of the optical path of the other color lights, in other words, in order to directly transmit the partial light beam incident on the incident-side lens 431 to the field lens 417.

The electric optical device 44 has the liquid crystal panels 441R, 441G and 441B as three optical modulators which, for instance, use a polysilicon TFT as a switching element. The color lights separated by the color-separating optical system 42 are modulated by the three crystal panels 441R, 441G and 441B in accordance with image information to form optical image. A pair of polarizers 445 and 446 having different polarization absorption axis directions are provided on the light-incident and light-irradiating side of the respective liquid crystal panels 441R, 441G and 441B.

The cross dichroic prism 45 combines the images modulated and irradiated from the three liquid crystal panels 441R, 441G and 441B to form a color image. Incidentally, a dielectric multilayer film for reflecting red light and another dielectric multilayer film for reflecting blue light are formed on the prism 45 along boundaries of the four right-angled prisms, the dielectric multilayers combining three color lights. The color image combined by the prism 45 is irradiated from the projection lens 46 and is enlarged and projected on a screen.

The above-described respective optical components 41 to 45 are disposed on a lower side of a main board 90 covered with a shield plate 91 as shown in FIGS. 3 and 5. Among the optical components 41 to 45, the optical elements of the optical unit 4 other than the electric optical device 44 and the cross dichroic prism 45 are sandwiched and held between a lower light guide 47 (FIG. 5) as an optical component casing of synthetic resin or metal and upper light guide (not shown). The lower light guide 47 is provided with a groove for slidably fitting the respective optical components 414 to 419, 421 to 424 and 431 to 434 from upper direction as well as a light source protector 471 for covering the light source 413.

Incidentally, the upper light guide and the lower light guide 47 are integrated and are fixed to the lower case 23 side by a fixing screw. The upper light guide and the lower light guide 47 are also fixed to the side of the cross dichroic prism 45 by a fixing screw.

A head portion 49 is formed on the light-irradiating side of the lower light guide 47. The prism 45 attached with the liquid crystal panels 441R, 441G and 441B is fixed to one end of the head portion 49 and the projection lens 46 is fixed to a flange along semi-cylindrical portion of the other end.

[3. Liquid Crystal Panel Attachment Unit]

Figure 6:
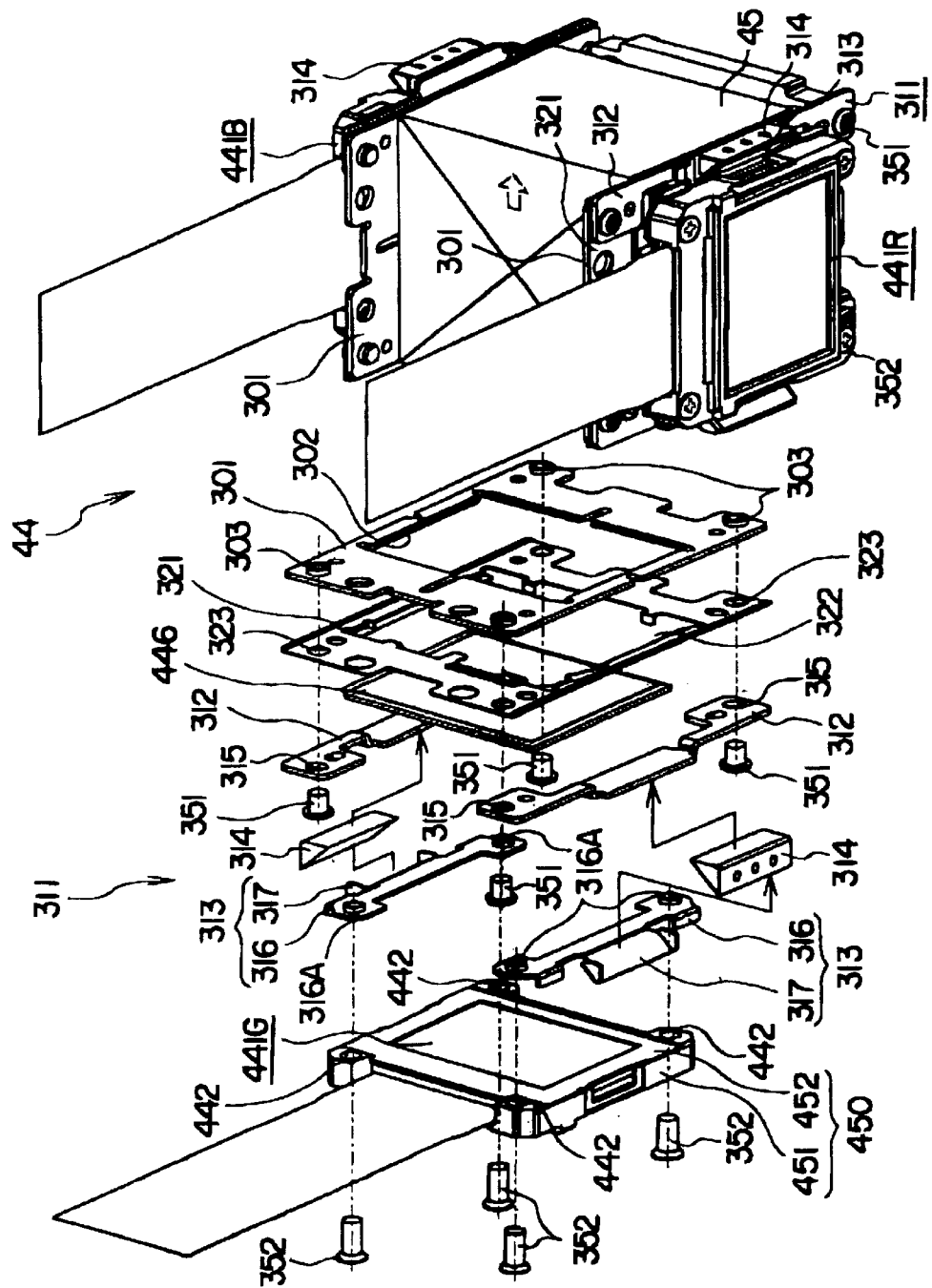
FIG. 6 is an exploded perspective view showing an attachment structure of a liquid crystal panel of the aforesaid embodiment.
Figure 7:
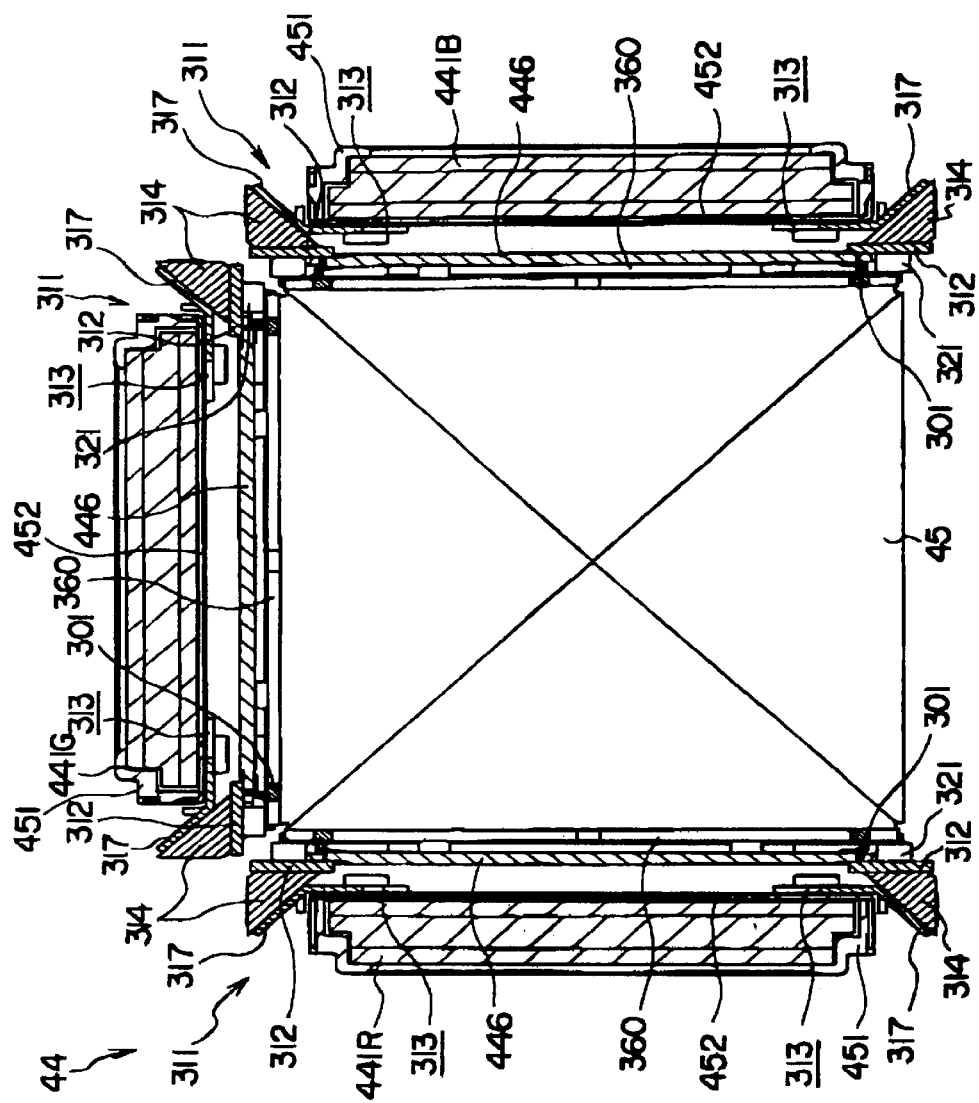
FIG. 7 is a cross section showing an attachment structure of a liquid crystal panel of the aforesaid embodiment.
Figure 8:
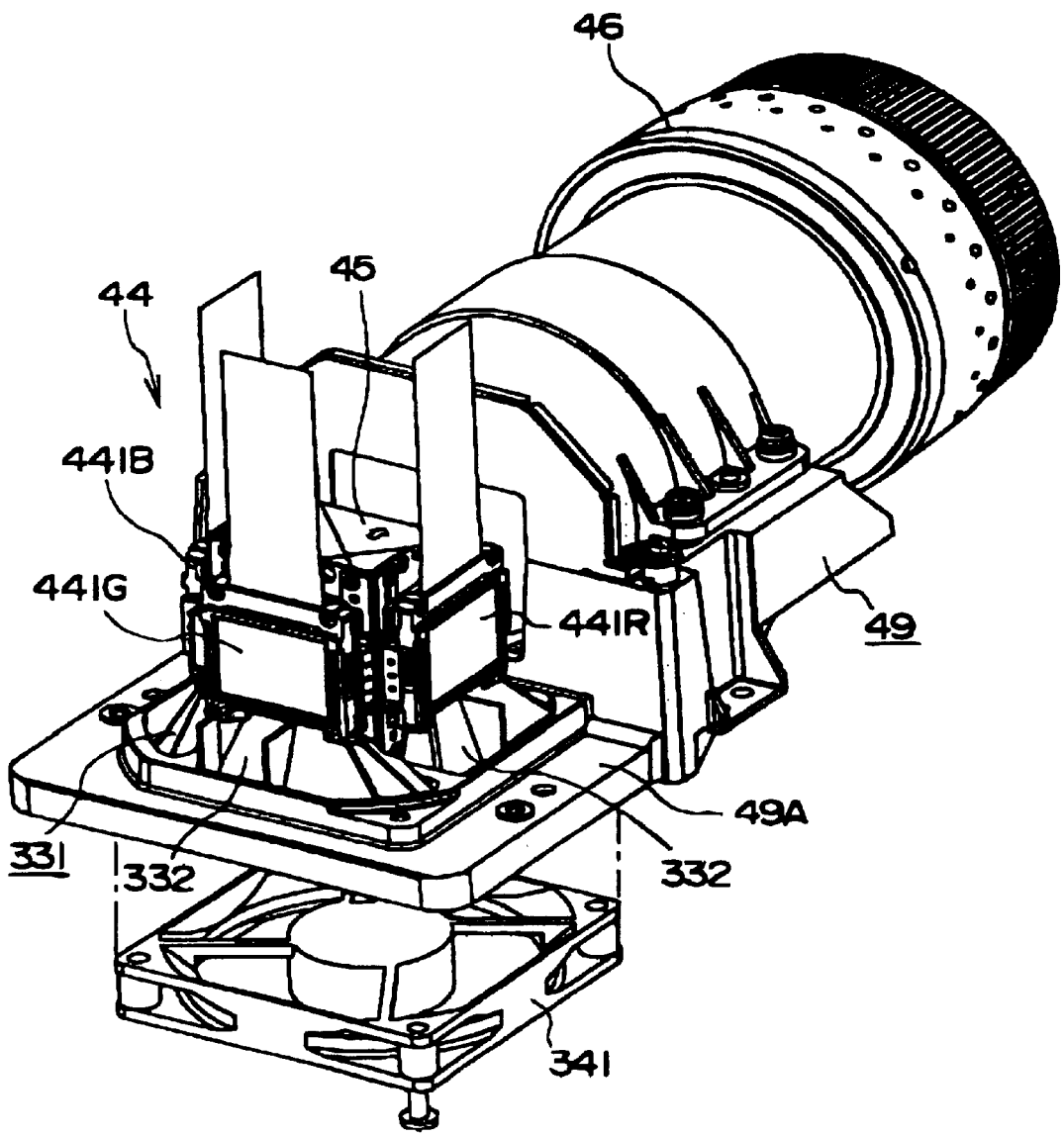
FIG. 8 is an exploded perspective view showing a head portion of the aforesaid embodiment.
Figure 9:
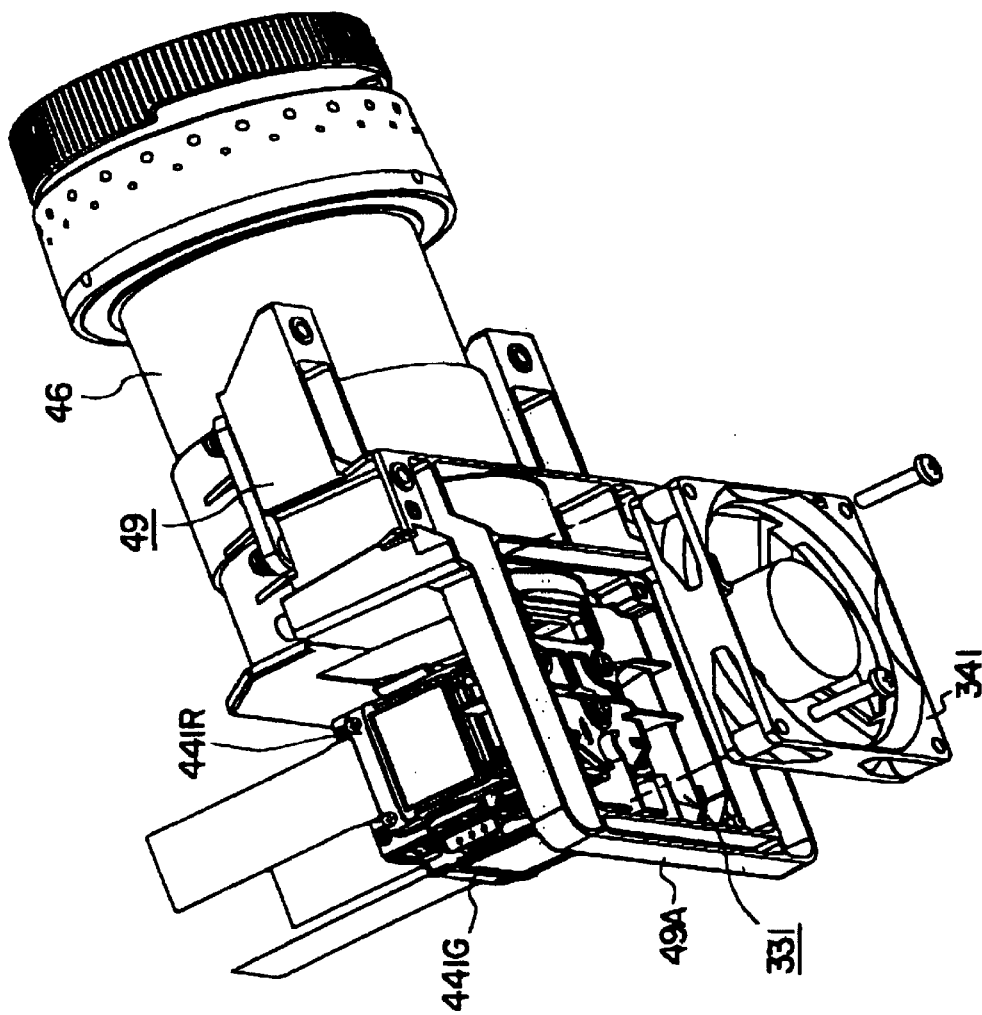
FIG. 9 is another exploded perspective view showing the head portion of the aforesaid embodiment.
Figure 10:
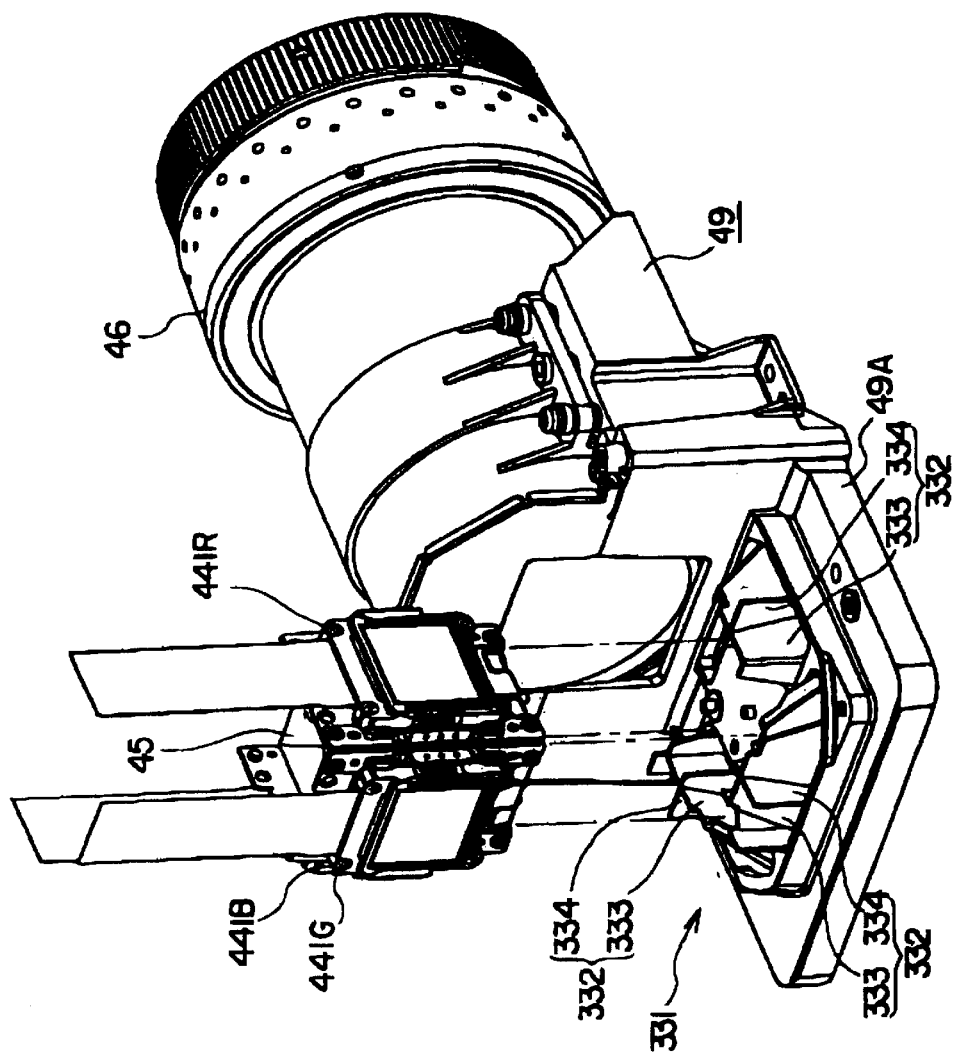
FIG. 10 is still another exploded view showing the head portion of the aforesaid embodiment.
Figure 11:
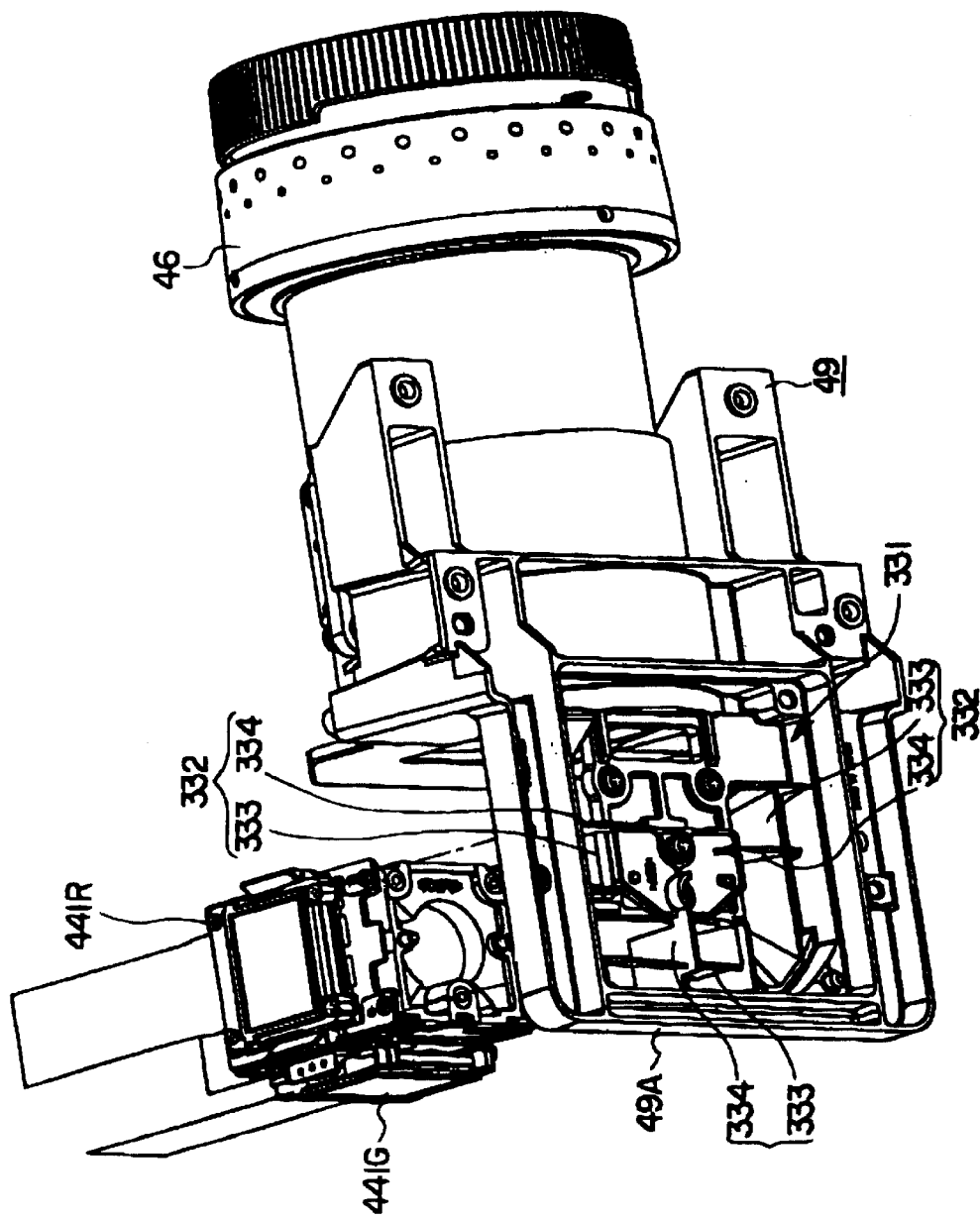
FIG. 11 is further exploded view showing the head portion of the aforesaid embodiment.

As shown in FIGS. 6 and 7, the liquid crystal panels 441R, 441G and 441B are attached to the cross dichroic prism 45 in a manner that the respective liquid crystal panels 441R, 441G and 441B oppose against three sides of the cross dichroic prism 45 as light-incident ends and are attached to the respective opposing sides (light-incident ends) of the cross dichroic prism 45 through a panel frame 450, a base member 301 and a support member 311. Incidentally, the panel frame 450, the base member 301 and the support member 311 are common to all of the liquid crystal panels 441R, 441G and 441B.

The panel frame has a first frame 451 for holding the liquid crystal panels 441R, 441G and 441B respectively from a light-incident side thereof and a second frame 452 for holding the liquid crystal panels from light-irradiating side. In other words, the respective liquid crystal panels 441R, 441G and 441B are sandwiched by the first frame 451 and the second frame 452. The panel frame 450 may be formed by resin or metal such as magnesium and aluminum. One of the two frames 451 and 452 may be made of resin and the other may be made of metal.

The base member 301 is attached to the light-incident end of the cross dichroic prism 45 by an adhesive etc., which has an opening 302 corresponding to the image formation area of the respective liquid crystal panels 441R, 441G and 441B and is shaped in rectangular frame. A screw insert hole 303 for a screw 351 to be inserted is formed on four corners of the base member 301. The base member 301 may be formed by a metal such as galvanized sheet iron.

The support member 311 has a pair of components for supporting neighborhood of both ends of the liquid crystal panels 441R, 441G and 441B, i.e. fixing plates 312 attached to the base member 301, a crystal panel fixing plate 313 as a pair of optical modulator fixing plate attached to the respective liquid crystal panels 441R, 441G and 441B, and a pair of spacers 314 interposed between the fixing plates 312 and the crystal panel fixing plates 313. The pair of components are, as shown in FIG. 6, disposed around the both ends of the liquid crystal panels 441R, 441G and 441B approximately in parallel. The fixing plates 312 and 313 may be formed by metal such as galvanized sheet iron. The spacer 314 may be formed by resin such as acrylic resin.

The pair of fixing plates 312 extend in the height direction of the crystal panels 441R, 441G and 441B and have width equal to the frame of the liquid crystal panels 441R, 441G and 441B, the pair of fixing plates 312 being formed in planar C-shape along the frame and being disposed on both ends of the respective liquid crystal panels 441R, 441G and 441B. A planar portion for the spacer 314 to be attached is formed on a longitudinal intermediate portion of the fixing plate 312.

The height of the fixing plate 312 is approximately the same as the height of the base member 301. A screw insert hole 315 for the screw 351 to be inserted is formed on a position corresponding to a screw insert hole 303 of the base member 301 on both ends in up and down directions.

The pair of liquid crystal panel fixing plates 313 respectively have a contact portion 316 and an extension 317 and is formed in planar T-shape.

The contact portion 316 extends in height direction of the liquid crystal panels 441R, 441G and 441B and has width of the frame of the liquid crystal panels 441R, 441G and 441B, the contact portion 316 being formed in planar C-shape along the frame and being abutted to both side end of the liquid crystal panels 441R, 441G and 441B.

The height of the contact portion 316 is approximately the same as the height of the liquid crystal panels 441R, 441G and 441B. A screw insert hole 316A for inserting a screw 352 is formed on a position corresponding to screw insert holes 442 formed on four corners of the liquid crystal panels 441R, 441G and 441B on up and down ends of the contact portion 316 for the screw 352 to be inserted.

The extension 317 is a slanted surface slanting and extending from a longitudinal intermediate portion of the contact portion 316 in a direction away from the liquid crystal panels 441R, 441G and 441B.

The screw insert hole 316A of the contact portion 316 is aligned to the screw insert hole 442 of the liquid crystal panels 441R, 441G and 441B and the screw 352 adhered with an adhesive is inserted thereto, thereby fixing the liquid crystal panel fixing plate 313 onto the liquid crystal panels 441R, 441G and 441B.

The pair of spacers 314 are respectively formed in triangular pillar having right triangle cross section and are disposed on side ends of the respective liquid crystal panels 441R, 441G and 441B. The spacers 314 are interposed between the fixing plate 312 and the liquid crystal panel fixing plate 313 with the slanted surfaces thereof being abutted to the backside of the extension 317 having the above-described slanted surface and one of the other two sides orthogonal with each other being abutted to a planar portion of the fixing plate 312.

The spacer 314 is for conducting focus and alignment adjustment of the respective liquid crystal panels 441R, 441G and 441B. The focus adjustment is mainly for accurately positioning the respective liquid crystal panels 441R, 441G and 441B at a back-focus position of a projection lens 46. The alignment adjustment is for positioning the respective liquid crystal panels 441R, 441G and 441B so that picture elements thereof correspond with each other. Specifically, the focus and alignment adjustment of the respective liquid crystal panels 441R, 441G and 441B are conducted by temporarily fixing the liquid crystal panels 441R, 441G and 441B attached with the liquid crystal panel fixing plate 313 to the spacer 314 and the insertion amount of the spacer 314 is adjusted (guided) along the slanted extension 317.

Further, the polarizer 446 on the light-incident side is held and fixed to a polarizer fixing plate 321 interposed between the base member 301 and the fixing plate 312 by an adhesive etc.

The polarizer fixing plate 321 has an opening 322 at the central portion thereof corresponding to the respective liquid crystal panels 441R, 441G and 441B and is formed in rectangular frame of approximately the same size as the base member 301. A screw insert hole 323 is formed on a position corresponding to the screw insert hole 303 of the base member 301 of the polarizer fixing plate 321. In other words, the base member 301, the fixing plate 312 and the polarizer fixing plate 321 are integrated by the screw 351. Incidentally, the polarizer fixing plate 321 may be formed by a metal such as stainless steel.

A process for attaching the liquid crystal panels 441R, 441G and 441B to the cross dichroic prism 45 will be briefly described below. Initially, the polarizer fixing plate 321 with the polarizer 446 being held and fixed and the fixing plate 312 are superposed on a predetermined position of the base member 301. The screw 351 is inserted to the respective screw insert holes 303, 323 and 315 to fix the polarizer fixing plate 321 and the fixing plate 312 to the base member 301. Thereafter, the liquid crystal panel fixing plate 313 is aligned to a predetermined position of the liquid crystal panels 441R, 441G and 441B. Then, the screw 352 is screwed to the respective screw insert holes 316A and 442 to fix the liquid crystal panel fixing plate 313 to the respective liquid crystal panels 441R, 441G and 441B.

Subsequently, ultraviolet curing adhesive is coated on a portion of the spacer 314 to be in contact with the fixing plate 312 and the liquid crystal panel fixing plate 313 and the spacer 314 is brought into contact with the liquid crystal panel fixing plate 313. Thereafter, the fixing plate 312 is brought into contact with the spacer 314. Then, weak ultraviolet is irradiated for temporarily fixing the fixing plate 312 and the liquid crystal panel fixing plate 313 onto the spacer 314. Next, the insertion amount of the spacer 314 is adjusted in the above condition to conduct focus and alignment adjustment of the liquid crystal panels 441R, 441G and 441B for locating the respective liquid crystal panels 441R, 441G and 441B at an appropriate position. Thereafter, strong ultraviolet is irradiated to fix the liquid crystal panels 441R, 441G and 441B to the cross dichroic prism 45.

[4. Cooling Mechanism of Liquid Crystal Panel]

As shown in FIGS. 8 to 11, the rectangular solid cross dichroic prism 45 attached with the liquid crystal panels 441R, 441G and 441B in the above-described manner is fixed by a fixing screw to a backside of the head portion 49 having approximately L-shaped side composed of integrated molding of magnesium.

More specifically, a bottom portion 49A of the head portion 49 having L-shaped side is disposed above the fan cover 235 of the lower case 23 and the cross dichroic prism 45 attached with the liquid crystal panels 441R, 441G and 441B is mounted and fixed at the approximate center of the upside of the bottom portion 49A of the head portion 49.

An opening is formed around a portion of the bottom portion 49A for the cross dichroic prism 45 being mounted and fixed, the opening being provided with a wind guide 331 having a plurality of wind guiding members 332 for guiding the air from below the bottom portion 49A into a predetermined direction.

A cooling fan 341 for introducing the outside air from the fan cover 235 as the cooling air is accommodated inside the bottom portion 49A. The cooling fan 341 is of approximately the same size as the wind guide 331, the cooling fan 341 being formed in planar square and fixed to the bottom portion 49A of the head portion 49 by a screw etc. Incidentally, the cooling fan 341 is an axial flow fan for spirally flowing the air discharged toward the liquid crystal panels 441R, 441G and 441B.

The liquid crystal panels 441R, 441G and 441B are cooled by the cooling air introduced by the cooling fan 341.

As described above, the support member 311 is constructed of pairs of components (the fixing plates 312, the liquid crystal panels fixing plates 313 and the spacer 314) for supporting neighborhood of both ends of the liquid crystal panels 441R, 441G and 441B, which are disposed parallel to the cooling air flow channel formed between the light-incident end of the cross dichroic prism 45 and the liquid crystal panels 441R, 441G and 441B.

The polarizer 446 is held and fixed spaced apart from the light-incident end of the cross dichroic prism 45 with a predetermined gap. Incidentally, the predetermined gap is an interval capable of forming cooling air flow channel between the polarizer 446 and the light-incident end of the cross dichroic prism 45. In the present embodiment, a gap 360 for the cooling air to pass from lower side to the upper side is formed as shown in FIG. 7.

By attaching the respective liquid crystal panels 441R, 441G and 441B to the cross dichroic prism 45 through the above-described support member 311 and the base member 301, the gap between the light-incident end of the cross dichroic prism 45 facing the cooling air flow channel and the respective liquid crystal panels 441R, 441G and 441B can be enlarged.

Further, by holding and fixing the polarizer 446 being spaced apart from the light-incident end of the cross dichroic prism 45 with a predetermined distance, the cooling air flow channel is also formed between the polarizer 446 and the light-incident end of the cross dichroic prism 45.

The surroundings of the liquid crystal panels 441R, 441G and 441B are covered with the lower light guide 47 and the upper side of the bottom portion 49A of the head portion 49, which constitute a duct. Accordingly, the cooling air can be easily introduced to the liquid crystal panels 441R, 441G and 441B.

Figure 12:
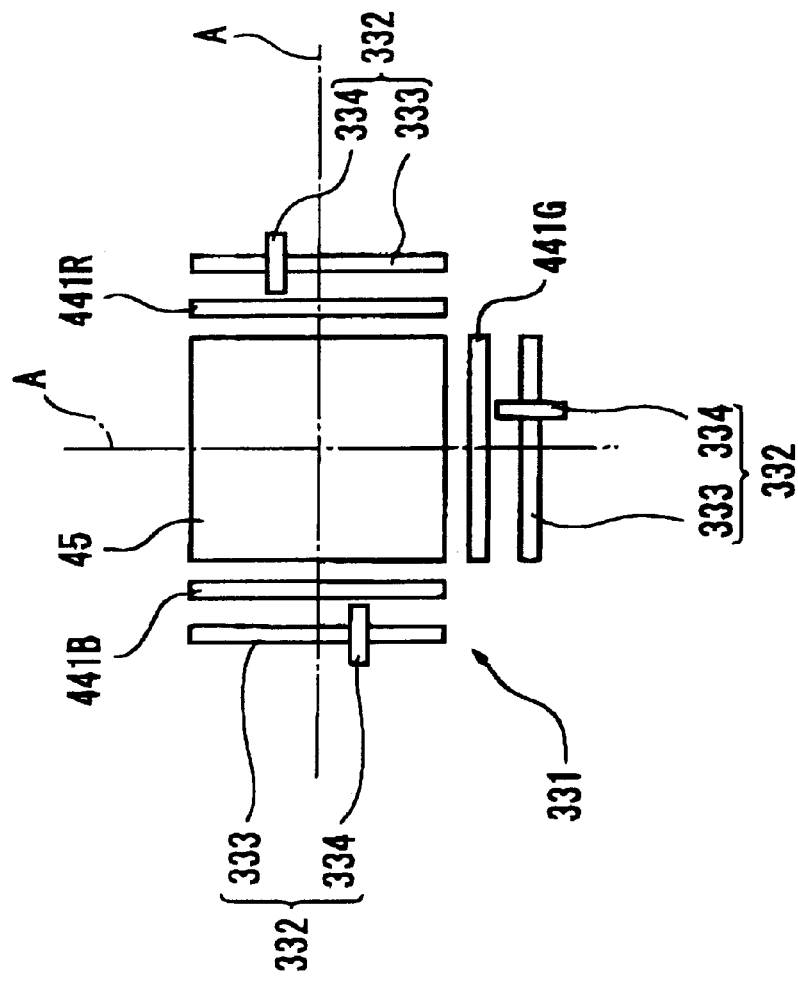
FIG. 12 is a schematic plan view showing a disposition of a wind guide of the aforesaid embodiment.

The wind guide 331 is disposed between the cooling fan 341 and the liquid crystal panels 441R, 441G and 441B. Further, as shown in FIG. 12, the wind guide 331 is disposed corresponding to the respective liquid crystal panels 441R, 441G and 441B and has three integrally-formed wind guide members.

The wind guide member 332 is for directing the cooling air from the cooling fan in a predetermined direction, which includes a first guide plate 333 and a second guide plate 334 and is formed in planar cross.

The first guide plate 333 is formed in a plate and is disposed approximately in parallel to the liquid crystal panels 441R, 441G and 441B viewed in a plane so that the first guide plate 333 is slanted downward from the side of the liquid crystal panels 441R, 441G and 441B to the outside (peripheral side of the bottom portion 49A). Accordingly, the cooling air from the cooling fan 341 is guided between the light-incident end of the cross dichroic prism 45 and the liquid crystal panels 441R, 441G and 441B.

The second guide plate 334 is formed in a plate and is fitted to a longitudinal intermediate portion of the first guide plate 333 to be orthogonal with the first guide plate 333. In other words, the second guide plate 333 extends in a direction orthogonal with the image formation area of the liquid crystal panels 441R, 441G and 441B.

The position for the second guide plate 334 to be attached to the first guide plate 333 is an upstream side of the spiral air discharged from the cooling fan 341 relative to horizontal center (single-dotted line A in FIG. 12) of the image formation area of the liquid crystal panels 441R, 441G and 441B. Accordingly, turbulence is generated to the air from the cooling fan 341 to blow the cooling air on the entire image formation area of the liquid crystal panels 441R, 441G and 441B.

In other words, the wind guide member 332 is for directing the cooling air from the cooling fan 341 to an area between the light-incident surface of the cross dichroic prism 45 and the liquid crystal panels 441R, 441G and 441B, and to the entire image formation area of the liquid crystal panels 441R, 441G and 441B.

Incidentally, FIG. 12 only schematically shows the configuration and disposition of the respective wind guide members, and the accurate configuration and disposition thereof and configuration etc. of the wind guide 331 including the wind guide member 332 are pursuant to FIGS. 8 to 11.

According to the present embodiment, following effects can be obtained.

Since the support member 311 for supporting the liquid crystal panels 441R, 441G and 441B is disposed in parallel to the cooling air flow channel formed between the light-incident end of the cross dichroic prism 45 and the respective liquid crystal panels 441R, 441G and 441B and is constructed of a pair of components for supporting the neighborhood of the ends of the liquid crystal panels 441R, 441G and 441B, the gap between the light-incident end of the cross dichroic prism 45 and the liquid crystal panels 441R, 441G and 441B facing the cooling air flow channel can be enlarged. Accordingly, cooling air sufficient for cooling the polarizer 446, the liquid crystal panels 441R, 441G and 441B etc. can be flowed in the direction of the cooling channel, thereby efficiently cooling the polarizer 446 and the liquid crystal panels 441R, 441G and 441B.

Further, since the fixing plate 312, the liquid crystal panel 313 and the spacer 314 constituting the support member 311 are disposed around the end of the liquid crystal panels 441R, 441G and 441B approximately in parallel, the gap between the light-incident end of the cross dichroic prism 45 and the respective liquid crystal panels 441R, 441G and 441B facing the cooling air flow channel can be enlarged, thereby enhancing cooling efficiency. Further, only by changing insertion amount of the pair of spacers 314 inserted to the end, the focus and alignment of the liquid crystal panels 441R, 441G and 441B can be adjusted.

Since the polarizer 446 is held and secured by the polarizer fixing plate 321 spaced apart from the light-incident end of the cross dichroic prism 45 with a predetermined distance, sufficient cooling air can be flowed not only between the polarizer 446 and the respective liquid crystal panels 441R, 441G and 441B but also between the polarizer 446 and the light-incident end of the cross dichroic prism 45, thereby efficiently cooling both sides of the polarizer 446.

Further, since a slanted surface (extension) for guiding the spacer 314 is formed on the liquid crystal panel fixing plate 313, the insertion amount of the spacer 314 can be adjusted along the slanted surface, thereby facilitating to adjust focus and alignment of the liquid crystal panels 441R, 441G and 441B.

Since the cooling fan 341 for cooling the liquid crystal panels 441R, 441G and 441B is provided below the cross dichroic prism 45 and the wind guide member 332 for directing the cooling air from the cooling fan 341 in a predetermined direction is provided between the cooling fan 341 and the liquid crystal panels 441R, 441G and 441B, the wind guide member 332 including the first guide plate 333 for guiding the cooling air between the light-incident end of the cross dichroic prism 45 and the liquid crystal panels 441R, 441G and 441B, the cooling air from the cooling fan 341 can be securely guided to the gap between the light-incident end of the cross dichroic prism 45 and the liquid crystal panels 441R, 441G and 441B, thereby further efficiently cooling the liquid crystal panels 441R, 441G and 441B etc.

Further, since the wind guide member 332 includes the second guide plate 334 extending in a direction orthogonal with the image formation area of the liquid crystal panels 441R, 441G and 441B, turbulence can be generated to the air from the cooling fan 341 by the second guide plate, so that the entire image formation area of the liquid crystal panels 441R, 441G and 441B can be uniformly cooled. Further, since the second guide plate 334 is disposed at a position of the upstream of the spiral air discharged from the cooling fan 341 relative to the horizontal center of the image formation area, the entire image formation area of the liquid crystal panels 441R, 441G and 441B can be easily cooled more uniformly and efficiently.

Further, since the wind guide members 332 are provided corresponding to the number of the liquid crystal panels 441R, 441G and 441B, the three wind guide members being integrally formed, the wind guide member can be more easily mounted as compared to an arrangement independently providing the wind guide member corresponding to the liquid crystal panels 441R, 441G and 441B, so that the wind guide member 332 can be easily assembled to the liquid crystal panels 441R, 441G and 441B.

[Modifications]

Incidentally, the scope of the present invention is not restricted to the above embodiments, but includes other arrangement as long as an object of the present invention can be achieved, which includes following modifications.

For instance, though the plurality of the wind guide members are integrally formed, the wind guide member may be independently provided corresponding to the respective liquid crystal panels 441R, 441G and 441B in order to change the direction of the cooling air to be blown in accordance with the position of the respective liquid crystal panels.

Further, the wind guide member is not limited to those having the first guide plate and the second guide plate, but a third guide plate and a fourth guide plate may be provided in accordance with the position of the respective liquid crystal panels and the direction of the blown cooling air, the configuration and arrangement of the wind guide member being appropriately determined in implementing the present invention.

Though the slanted surface is provided to the optical modulator fixing plate, the optical modulator fixing plate may be provided with a horizontal surface when the configuration of the spacer is a square pillar having a slanted surface on one end.

Further, though the polarizer is held and fixed being spaced apart from the light-incident side of the cross dichroic prism with a predetermined gap, the polarizer may be provided to the light-incident end of the cross dichroic prism without being spaced apart.

Though the polarizer fixing plate 321 holds and fixes the polarizer 446 in the above-described embodiment, polarizing element other than the polarizer may be fixed by the polarizer fixing plate 321. Examples of the polarizing element other than the polarizer are retardation plate and reflection polarizer. Accordingly, both sides of the polarizer held by the polarizer fixing plate 321 can be efficiently cooled.

Though the support member includes the fixing plate, the liquid crystal panel fixing plate and the spacer, the support member may only be constructed of a pair of components disposed in parallel to the cooling air flow channel formed between the light-incident end of the cross dichroic prism and the liquid crystal panel for supporting the neighborhood of the liquid crystal panel and specific arrangement may be determined in any manner in implementing the present invention.

The polarizer fixing plate may be constructed of a pair of components in the same manner as the support member. Accordingly, the cooling efficiency of the light-incident end of the cross dichroic prism can be further enhanced.

What is claimed is:

1. A cooling mechanism of an optical modulator plurally attached to a light-incident end of a prism in plural, the optical modulator modulating a plurality of color lights in accordance with image information and emitting the modulated light to the light-incident end of the prism, the cooling mechanism comprising:

a base member attached to the light-incident end of the prism;

a support member attached to the base member that supports the optical modulator, the support member including a pair of components disposed parallel to a cooling air flow channel formed between the light-incident end of the prism and the optical modulator, the pair of components supporting a neighborhood of an end of the optical modulator;

a polarizer provided on a light-emitting side of the optical modulator; and a polarizer fixing plate that holds and fixes the polarizer provided between the base member and the optical modulator, the polarizer fixing plate holding and fixing the polarizer being spaced apart with a predetermined gap from the light-incident end of the prism.

2. The cooling mechanism of an optical modulator according to claim 1, wherein the support member includes a fixing plate attached to the base member, an optical modulator fixing plate attached to the optical modulator and a spacer interposed between the fixing plate and the optical modulator fixing plate, the fixing plate, the optical modulator fixing plate and the spacer being disposed approximately in parallel around the end of the optical modulator.

3. The cooling mechanism of an optical modulator according to claim 2, wherein a slanted surface that guides the spacer is formed on the optical modulator fixing plate.

4. The cooling mechanism of an optical modulator according to claim 1, further comprising: a cooling fan that cools the optical modulator; and a wind guide provided between the cooling fan and the optical modulator that introduces the cooling air from the cooling fan in a predetermined direction, the wind guide including a first guide plate that directs the cooling air toward between the light-incident end of the prism and the optical modulator.

5. The cooling mechanism of an optical modulator according to claim 4, the wind guide further comprising a second guide plate extending in a direction orthogonal with an image formation area of the optical modulator.

6. The cooling mechanism of an optical modulator according to claim 4, wherein the wind guide is provided in accordance with the number of the optical modulator, the plurality of wind guides being integrally formed.

7. A projector comprising a cooling mechanism of an optical modulator according to claim 1.

8. An optical modulator attachment unit that attaches an optical modulator on a light-incident end of a prism, comprising:

a holding frame that holds the optical modulator;

a base member attached to a light-incident end of the prism;

a pair of support members attached between the base member and the holding frame, the support member being formed by a pair of components that support a neighborhood of an end of the optical modulator;

a polarizer provided on a light-emitting side of the optical modulator; and a polarizer fixing plate that holds and fixes the polarizer provided between the base member and the holding frame, the polarizer fixing plate holding and fixing the polarizer being spaced apart from the light-incident end of the prism with a predetermined gap.

9. The optical modulator attachment unit according to claim 8, the support member comprising: a fixing plate attached to the base member; an optical modulator fixing plate attached to the holding frame; and a spacer interposed between the fixing plate and the optical modulator fixing plate.

10. The optical modulator attachment unit according to claim 9, wherein a slanted surface that guides the spacer is formed on the optical modulator fixing plate.

11. A projector comprising an optical modulator attachment unit according to claim 8.

12. The projector according to claim 11, further comprising:

a cooling fan that cools the optical modulator; and a wind guide that introduces a cooling air from the cooling fan in a predetermined direction, the wind guide including a first guide plate that guides the cooling air provided between the light-incident end of the prism and the optical modulator.

13. The projector according to claim 12, the wind guide comprising a second guide plate extending in a direction orthogonal with an image formation area of the optical modulator.

14. The projector according to claim 12, wherein the wind guide is provided corresponding to the number of the optical modulator, and wherein the plurality of wind guide is integrally formed.

15. The projector according to claim 7, further comprising: a polarizer provided on a light-emitting side of the optical modulator; and a polarizer fixing plate that holds and fixes the polarizer provided between the base member and the optical modulator, the polarizer fixing plate holding and fixing the polarizer being spaced apart with a predetermined gap from the light-incident end of the prism.

16. The projector according to claim 7, wherein the support member includes a fixing plate attached to the base member, an optical modulator fixing plate attached to the optical modulator and a spacer interposed between the fixing plate and the optical modulator fixing plate, the fixing plate, the optical modulator fixing plate and the spacer being disposed approximately in parallel around the end of the optical modulator.

17. The projector according to claim 16, wherein a slanted surface that guides the spacer is formed on the optical modulator fixing plate.

18. The projector according to claim 7, further comprising: a cooling fan that cools the optical modulator; and a wind guide provided between the cooling fan and the optical modulator that introduces the cooling air from the cooling fan in a predetermined direction, the wind guide including a first guide plate that directs the cooling air toward between the light-incident end of the prism and the optical modulator.

19. The projection according to claim 18, the wind guide further comprising a second guide plate extending in a direction orthogonal with an image formation area of the optical modulator.

20. The projector according to claim 18, wherein the wind guide is provided in accordance with the number of the optical modulator, the plurality of wind guides being integrally formed.

21. The projector according to claim 11, further comprising: a polarizer provided on a light-emitting side of the optical modulator; a polarizer fixing plate that holds and fixes the polarizer provided between the base member and the holding frame, the polarizer holding plate holding and fixing the polarizer being spaced apart from the light-incident end of the prism with a predetermined gap.

22. The projector according to claim 11, wherein the support member comprising: a fixing plate attached to the base member; an optical modulator fixing plate attached to the holding frame; and a spacer interposed between the fixing plate and the optical modulator fixing plate.

23. The projector according to claim 22, wherein a slanted surface that guides the spacer is formed on the optical modulator fixing plate.

24. A cooling mechanism of an optical modulator plurally attached to a light-incident end of a prism in plural, the optical modulator modulating a plurality of color lights in accordance with image information and emitting the modulated light to the light-incident end of the prism, the cooling mechanism comprising:

a base member attached to the light-incident end of the prism;

a support member attached to the base member that supports the optical modulator, the support member including a pair of components disposed parallel to a cooling air flow channel formed between the light-incident end of the prism and the optical modulator, the pair of components supporting a neighborhood of an end of the optical modulator;

a cooling fan that cools the optical modulator; and a wind guide provided between the cooling fan and the optical modulator that introduces the cooling air from the cooling fan in a predetermined direction, the wind guide including a first guide plate that directs the cooling air toward between the light-incident end of the prism and the optical modulator.

* * * * *